United States Patent [19]

Segal

[11] Patent Number: 5,628,861

[45] Date of Patent: May 13, 1997

[54] METHOD FOR ADHESIVELY BONDED LAMINATE FOR USE IN AN ELECTRICAL APPARATUS SUCH AS A TRANSFORMER, GENERATOR, OR MOTOR

[75] Inventor: Vladimir M. Segal, Cary, N.C.

[73] Assignee: ABB Power T&D Company Inc., Raleigh, N.C.

[21] Appl. No.: 377,841

[22] Filed: Jan. 25, 1995

[51] Int. Cl.$^6$ .............. B05D 5/02; B05D 5/10; B32B 31/12; H01F 41/02

[52] U.S. Cl. ............ 156/291; 29/609; 156/184; 156/295; 427/104; 427/127; 427/208.6; 427/286

[58] Field of Search ................... 156/184, 191, 156/192, 290, 291, 295; 427/127, 104, 208.6, 116, 286; 336/177, 222, 234, 218; 29/609

[56] References Cited

U.S. PATENT DOCUMENTS

| | | | |
|---|---|---|---|
| 1,445,070 | 2/1923 | Clune | 156/291 X |
| 2,261,983 | 11/1941 | Ford | 156/295 X |
| 2,488,685 | 11/1949 | Riddle | 91/47 |
| 2,554,262 | 5/1951 | Nagel | 336/218 X |
| 2,674,974 | 4/1954 | Gwinn et al. | 118/210 |
| 3,153,215 | 10/1964 | Burkhardt et al. | 336/217 |
| 3,279,425 | 10/1966 | Gotscho | 118/202 |
| 3,330,717 | 7/1967 | Roullard | 156/548 |
| 3,386,058 | 5/1968 | Michel | 336/60 |
| 3,412,450 | 11/1968 | Whiteman et al. | 29/564.6 |
| 3,419,958 | 1/1969 | Obenschain | 29/602.1 |
| 3,420,429 | 1/1969 | Lewis et al. | 228/3.1 |
| 3,460,367 | 8/1969 | Subovici | 72/324 |
| 3,553,622 | 1/1971 | Subovici | 336/219 |
| 3,579,164 | 5/1971 | Rotruck | 336/100 |
| 3,671,284 | 6/1972 | Uhrig | 117/21 |
| 3,682,738 | 8/1972 | Smith | 156/283 |
| 3,815,067 | 6/1974 | Koh | 336/83 |
| 4,025,379 | 5/1977 | Whetstone | 29/609 |
| 4,032,673 | 6/1977 | Schroeter et al. | 427/518 |
| 4,047,138 | 9/1977 | Steigerwald | 336/100 |
| 4,070,214 | 1/1978 | Brown et al. | 156/47 |
| 4,100,521 | 7/1978 | Hori | 336/100 |
| 4,200,854 | 4/1980 | DeLaurentis et | 336/217 |
| 4,277,530 | 7/1981 | Miller | 428/216 |
| 4,288,492 | 9/1981 | Hiromae et al. | 428/336 |
| 4,325,096 | 4/1982 | Sunohara et al. | 361/45 |
| 4,364,020 | 12/1982 | Lin et al. | 336/212 |
| 4,370,182 | 1/1983 | Becker et al. | 156/52 |
| 4,413,406 | 11/1983 | Bennett et al. | 29/609 |
| 4,496,925 | 1/1985 | Geschks | 336/178 |
| 4,504,813 | 3/1985 | Strang | 336/216 |
| 4,521,957 | 6/1985 | McLeod | 29/609 |
| 4,741,096 | 5/1988 | Lee et al. | 29/605 |
| 4,741,474 | 5/1988 | Potet et al. | 228/190 |

(List continued on next page.)

FOREIGN PATENT DOCUMENTS 60548  9/1947  Netherlands.

*Primary Examiner*—Michael W. Ball
*Assistant Examiner*—Francis J. Lorin
*Attorney, Agent, or Firm*—Woodcock Washburn Kurtz Mackiewicz & Norris

[57] ABSTRACT

A method for manufacturing a laminate comprising at least two sheets of magnetic material is disclosed. The laminate may be used to form a stacked transformer core. The method increases the productivity of the core-stacking process, decreases the core loss destruction factor, decreases total core loss, decreases acoustic noise generated by the electrical device employing the laminate, and does all of this in a manner which is commercially practical. The method comprises applying an adhesive, preferably a hot melt adhesive, in a pattern of thin beads onto one side of a first lamina or sheet of magnetic material, the pattern comprising a plurality of lines, the lines being substantially parallel to each other and substantially perpendicular to a direction of grain orientation or rolling direction of the lamina. A second lamina is then stacked onto the one side of the first lamina, and then a compressive force is applied to specified areas of the laminate. The spacing between the respective lines of adhesive is preferably 1–20 millimeters and, for an approximate diameter (D) of each bead, the spacing (S) between the beads of each line is preferably between D and 2D.

15 Claims, 2 Drawing Sheets

U.S. PATENT DOCUMENTS

| | | | |
|---|---|---|---|
| 4,782,994 | 11/1988 | Raybould et al. | 228/235.3 |
| 4,814,736 | 3/1989 | Lee et al. | 336/213 |
| 4,819,322 | 4/1989 | Higuchi et al. | 29/605 |
| 4,845,454 | 7/1989 | Watanabe et al. | 336/212 |
| 4,897,916 | 2/1990 | Blackburn | 29/609 |
| 4,900,390 | 2/1990 | Colton et al. | 156/291 |
| 5,050,293 | 9/1991 | Baldi et al. | 29/605 |
| 5,134,771 | 8/1992 | Lee et al. | 29/609 |
| 5,185,196 | 2/1993 | Grosclaude | 428/194 |
| 5,204,653 | 4/1993 | Saitoh et al. | 336/178 |
| 5,240,541 | 8/1993 | Lin et al. | 156/270 |
| 5,284,541 | 2/1994 | Kambara | 156/192 |

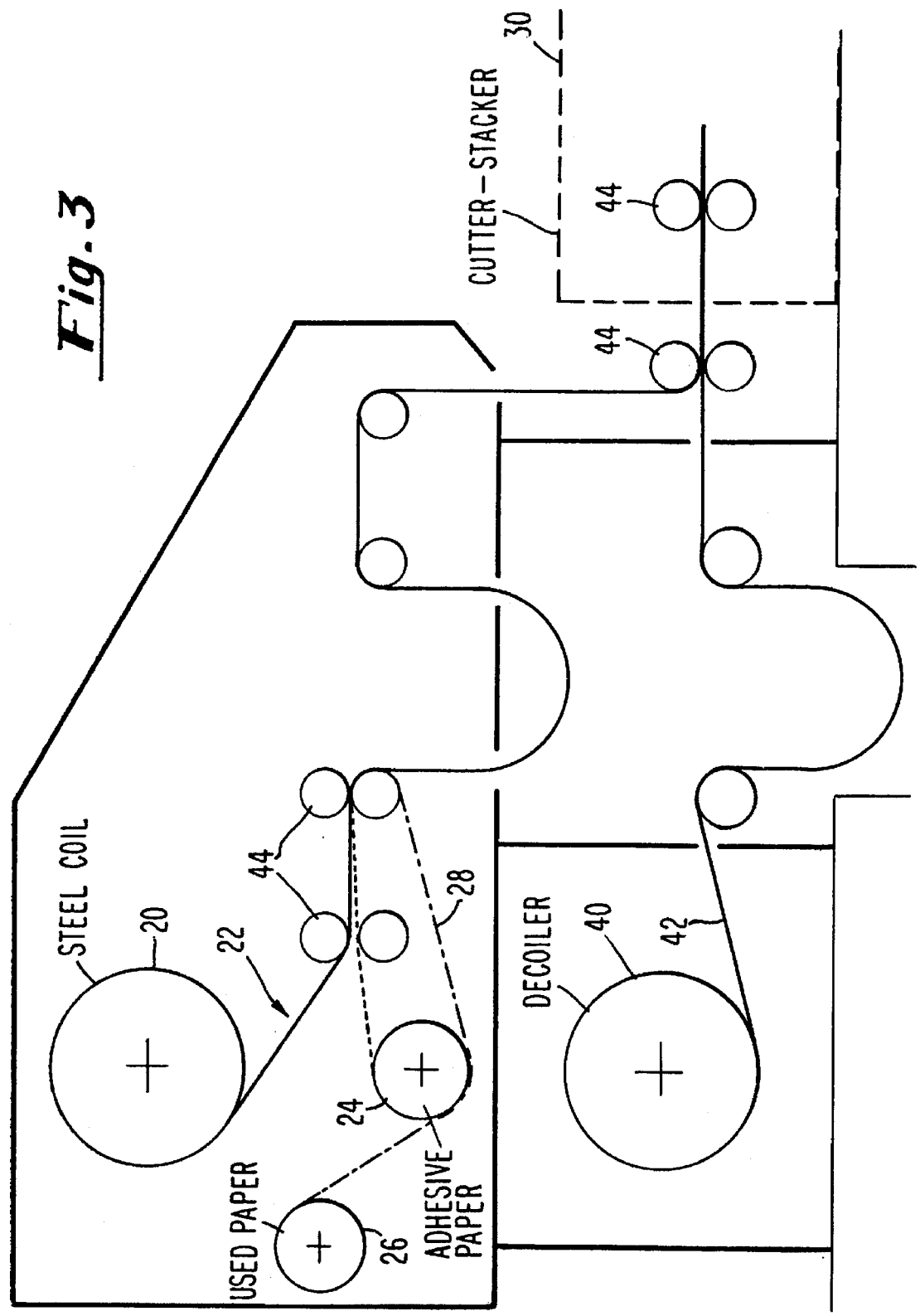

METHOD FOR ADHESIVELY BONDED LAMINATE FOR USE IN AN ELECTRICAL APPARATUS SUCH AS A TRANSFORMER, GENERATOR, OR MOTOR

FIELD OF THE INVENTION

The present invention relates generally to methods for manufacturing a laminate comprising at least two laminae (e.g., sheets or ribbons) of magnetic material, and more particularly to a method for manufacturing an adhesively bonded laminate useful in a transformer, generator or motor. One presently preferred application of the invention is in a stacked transformer core.

BACKGROUND OF THE INVENTION

Adhesively bonded laminates are employed to make electrical apparatus that rely on magnetic induction. Such apparatus include transformers, generators, motors, and the like. For example, the iron core of a transformer may comprise at least one main leg and yokes constructed of laminae of magnetic material (such as textured silicon steel or an amorphous alloy), the legs and yokes being joined at their ends with a 45° oblique or rectangular abutment.

In using electrical steels in electrical applications, an objective is to reduce the energy loss associated with magnetization of the steel sheets. For example, the energy loss in the magnetic core ("iron loss") of a transformer can be decreased by optimizing the design of the core and decreasing the specific loss of the material of which the core laminae are made. The latter objective has been achieved to some extent by improving the electrical steel in terms of chemical purity, grain structure, and crystallographic texture. The design of the core can be optimized to some extent by employing thinner gauge electrical steel sheets, since a thin sheet provides a reduced path over which magnetically-induced eddy currents may flow.

Although metallurgical limitations presently dictate a sheet thickness lower limit of about 0.004 to 0.005 in., the practical lower limit for sheet thickness is, to a large extent, determined by the consumers of these sheets, who use the sheets to fabricate electrical apparatus. Thin gauge sheets are expensive to use because they are more susceptible to being damaged and because they require additional labor in the fabrication of various electrical devices. Moreover, the core building factor tends to increase as the space factor decreases and the sheets are stressed while being stacked. (Building factor increases as sheet thickness decreases because: (1) an increase in the number of laminae per core increases the reactive volume between layers filled with insulation and air gaps; (2) the steel is stressed while handling the thinner sheets; (3) an increase in the number of layers results in an increase in the number of joints per unit mass; and (4) an increase in the average length of a cut sheet per unit mass increases the relative volume of steel deteriorated along the cut edges and increases the interlaminar loss.) Such considerations are the reason most commercially available steel sheets are provided by steel producers within a thickness range of from about 0.009 to 0.015 inch (0.23 to 0.40 mm).

Thus, there is a gap, in terms of sheet thickness, between what steel producers could offer and what electrical device manufacturers (e.g., stacked core makers) are willing to use. By implementing the thinnest available steel, it is presently possible to decrease the average no load loss in a stacked transformer core by 7–20%. The potential improvement in core loss will increase as thinner steel grades become possible.

U.S. Pat. No. 4,277,530, Jul. 7, 1981, titled, "Electric Steel Lamination," discloses a laminated article for electrical applications that includes two sheets of electrically isolated electrical steel each having a thickness of less than 0.020 inch (20 mils). A major shortcoming of the process disclosed in this patent is that it requires bonding at the steel manufacturer's site. The bonding procedure is impractical because it requires the steel manufacturer to fully complete the bonding, including adhesive polymerization, before coiling/uncoiling the steel. Bonding of the bent laminae is not permitted because the residual stress resulting from such bonding adversely affects steel quality, particularly when the radius of curvature is less than 187 inches, which is typically the case when steel is coiled.

Another drawback of the invention disclosed in U.S. Pat. No. 4,277,530 is that it requires the use of a heat curable adhesive layer. This layer has a thickness of about 0.001 inch, which is 5% (assuming a sheet thickness of 10 mils) or more of the doubled steel thickness, resulting in a decrease in space factor of 5% or more. To one skilled in the art, it is clear that this is absolutely unacceptable, since each 1% decrease in space factor increases the power loss by 1½ to 2%.

Moreover, thin and solid adhesive film, when pressed between two sheets of steel as disclosed in U.S. Pat. No. 4,277,530, becomes thicker near the center and thinner at the edges of the laminate. When compression is applied to the stacked laminate, the difference in thickness creates compressive stresses and decreases the laminate's mechanical stability and deteriorates its shape.

U.S. Pat. No. 4,413,406, Nov. 8, 1983, titled "Processing Amorphous Metal Into Packets By Bonding With Low Melting Point Material," discloses a method for making transformer cores with a metallic bonding material. The disclosed method requires that the sheets be heated and bonded together, and then allowed to cool so that the bond solidifies. This requirement is believed by the present inventor to be objectionable because it impedes (slows) production. Moreover, this patent fails to address ways to limit the decrease in space factor caused by the bonding process.

Noise is also a problem associated with transformer cores. For example, in a transformer with high and low voltage windings on the main legs of the core, it is well known that vibrations having a fundamental frequency of twice the commercial power supply frequency occur. These vibrations are transmitted through the iron core support and oil to the tank, and are then propagated into the air. Such vibrations are attributable to the magnetostriction of the magnetic material forming the core, which is a consequence of the extension or contraction of the magnetic material in the direction of magnetization with a certain magnetic flux density. The noise caused by the vibration of the iron core is conventionally suppressed by surrounding the transformer with a sound-absorbing wall of concrete or the like, or constructing the tank with double walls, or arranging noise-absorbing material or gas-contained bags of noise-proofing material between the double walls of the tank. However, none of these methods is efficient in terms of cost or effectiveness.

SUMMARY OF THE INVENTION

Accordingly, an object of the present invention is to provide a method for manufacturing a laminate comprising at least two laminae or sheets of magnetic material, which method increases the productivity of the core-stacking process, decreases the core loss destruction factor, decreases total core loss, decreases acoustic noise generated by the electrical device employing the laminate, and does all of this in a manner which is commercially practical.

One aspect of the present invention provides a method for manufacturing a laminate comprising at least two laminae (sheets or ribbons) of magnetic material. The inventive method comprises the steps of, first, applying an adhesive, preferably a hot melt adhesive, in a pattern of thin beads onto one side of a first lamina or sheet of magnetic material, the pattern comprising a plurality of lines, the lines being substantially parallel to each other and substantially perpendicular to a rolling direction of the lamina. Next, a second lamina or sheet is stacked onto the one side of the first lamina. A compressive force is then applied to specified areas of the laminate.

The spacing between the respective lines of adhesive is preferably 1–20 millimeters, and more preferably 5–10 millimeters. For a given approximate diameter (D) of each dot, the spacing (S) between the dots of each line is preferably D<S<2D.

According to a preferred embodiment of the invention, at least two laminates are joined to form an article having one or more joint-adjacent regions, and the adhesive is applied in the joint-adjacent regions. Alternatively, the adhesive may be applied throughout the laminate, as opposed to only in the joint-adjacent regions. To optimize the flow of magnetic flux, the compressive force may be applied in the joint-adjacent regions.

Preferably, the lamina comprise soft magnetic material, e.g., a textured silicon steel or an amorphous alloy.

The inventive method may also include the step of cutting or shearing the laminate immediately (in terms of the process, not time) after the step of applying adhesive, which may be applied by direct application of the beads onto the first lamina or by a transfer technique.

Preferably, at least six laminae are stacked to form a group that, in use, vibrates as a unit. Plural groups are then adhesively bonded to form a transformer core that vibrates as a unit.

Another aspect of the present invention provides a mobile adhesive bonding system comprising means for carrying out the inventive process.

Other features and advantages of the invention are disclosed below.

BRIEF DESCRIPTION OF THE DRAWINGS

FIG. 3 depicts one preferred embodiment of a mobile adhesive bonding system in accordance with the present invention.

DETAILED DESCRIPTION OF PREFERRED EMBODIMENTS

The present invention was developed in the process of designing a method for manufacturing an electrical steel laminate that combines the low energy loss characteristics of thinner sheets of silicon steel with the inherent advantages of manufacturing the electrical device (e.g., stacked transformer core) when thicker sheets are used.

Figure 1:
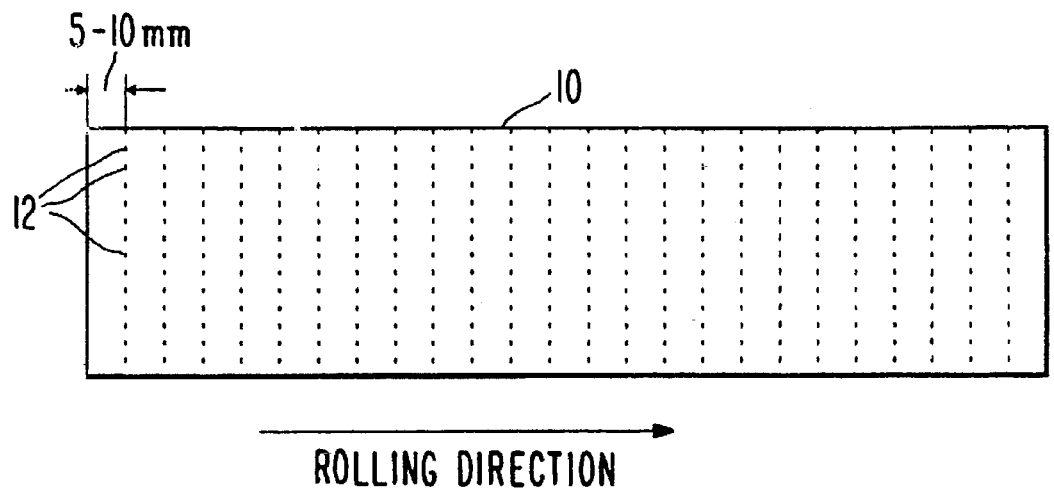
FIG. 1 depicts a preferred adhesive pattern on a single steel sheet or ribbon in accordance with the present invention.

FIG. 1 schematically depicts an electrical steel sheet 10 bearing on one surface an adhesive pattern in accordance with the present invention. As shown, the adhesive pattern comprises thin dots or beads of adhesive 12 oriented in parallel lines, which lines are arranged substantially perpendicularly to the rolling direction of the sheet, which is indicated by the arrow. In the embodiment shown in FIG. 1, the spacing between the respective lines of adhesive is preferably 1–20 millimeters, and more preferably 5–10 millimeters. The line spacing should be selected in accordance with the quality of steel used, and if done properly will decrease the core loss by about 1–5%. For a given approximate diameter (D) of each dot, the spacing (S) between the dots of each line is preferably D<S<2D. This dot spacing has been found to optimize the space (or filling) factor of a stacked core, and the recommended spacing between lines has been found to optimize the core loss. It should be noted that the lines of adhesive need only be generally perpendicular to the rolling direction and parallel to each other— i.e., there is no need for mathematical precision in applying the adhesive.

Figure 2:
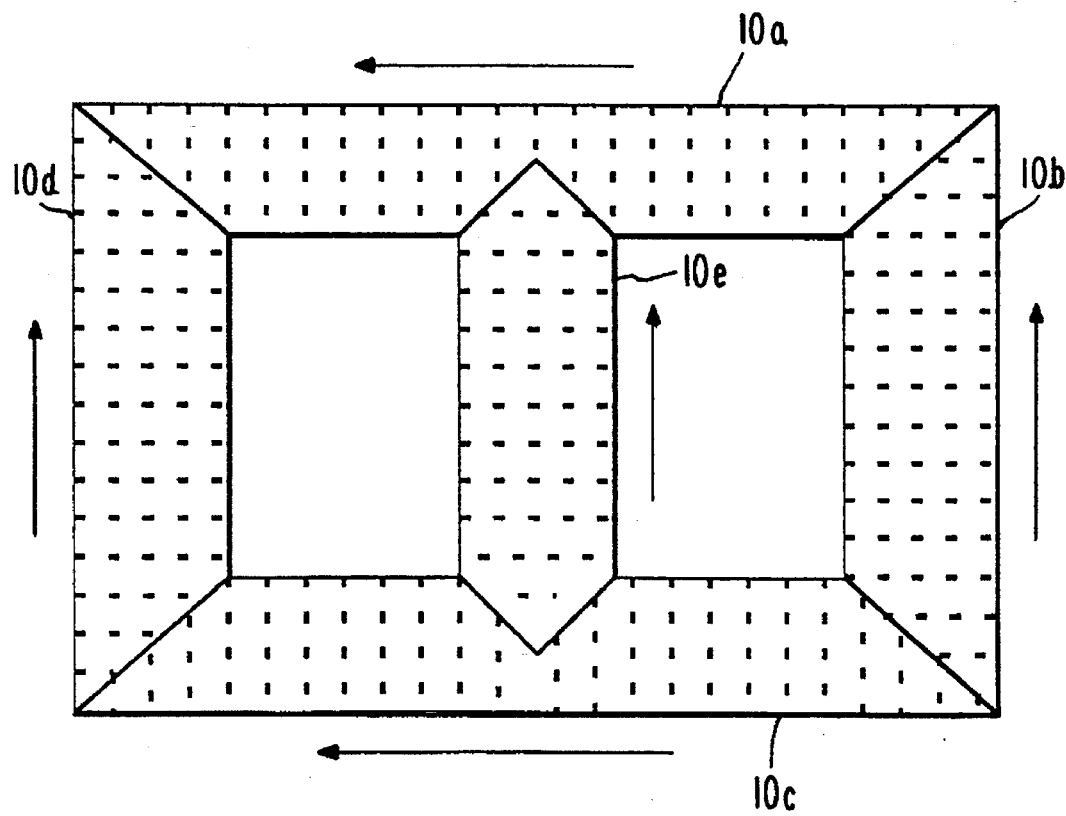
FIG. 2 depicts a single layer of a stacked transformer core in accordance with the present invention. The arrows indicate the rolling direction of the sheets making up the core.

FIG. 2 depicts a single layer of a stacked transformer core in accordance with the present invention. As in FIG. 1, the arrows indicate the rolling direction of the sheets (denoted 10a, 10b, 10c, 10d, and 10e) making up the core. Of course, in an actual core, the adhesive pattern cannot be seen because it is enclosed between the laminae forming the stacked core. The dotted lines across the rolling direction act as sources for local stress and provide core loss decrease via domain refinement. This effect is like that produced by laser scribing.

Preferably, the following conditions should be observed in practicing the invention:

(1) the increase in the thickness of the laminate due to application of the adhesive should be limited to not more than 0.2 mils, to limit the decrease in the stacking factor to no more than 2%;

(2) the laminated article should be rigid enough to be handled as a single laminate with double thickness;

(3) in applications of the invention for making a stacked transformer core, the adhesive should be compatible with the transformer oil;

(4) generally, no irregular compressive stress, imposed on the steel due to adhesive shrinkage, should be allowed;

(5) the laminate should be ready for handling soon (e.g., approximately 10 seconds) after the sheets are brought into contact, which requires a quick-curing adhesive;

(6) bonding should withstand a temperature increase of up to 140° C.;

(7) no increase in burr height should occur when the laminated article is cut; and (8) the bonding technology and machinery employed to implement the bonding should fit the existing core manufacturing procedure.

The present invention increases productivity in manufacturing a stacked transformer core (or like device) by adhesively bonding two or more thin strips (laminates) of soft magnetic material, such as textured silicon steel or an amorphous alloy, into a single multilayered article. In addition, the invention increases the efficiency of power transformation in stacked transformer cores. This is accomplished by decreasing the core loss destruction factor by optimizing the magnetic domain structure and flux distribution in the joint-adjacent parts of the core. (Note that the "core loss destruction factor" refers to the deterioration of the iron loss characteristic of the steel provided by the steel manufacturer due to the processing performed in making a core.) Such optimization is achieved by applying localized compressive stress to these parts. This can be achieved by (a) applying the adhesive in a pattern of thin beads on one side of a single strip, preferably in areas that will become joint-adjacent after the particular core laminate is cut out of the bonded article; (b) properly orienting the beads against the main directions of the magnetic flux flow; and (c) applying compressive forces of different magnitudes to the different areas of the stacked core.

The adhesive is applied to pre-defined areas of one of two adjacent surfaces of sheets to be bonded together, preferably immediately before performing a shearing (cutting) procedure. This increases the productivity of this procedure in direct proportion to the number of strips bonded. Several important results are accomplished with no major changes in the existing technology for manufacturing a stacked core:

(1) the productivity of the core stacking process is at least doubled;

(2) core loss destruction factor is decreased by 1 to 5%, depending on the design of the core;

(3) total core loss is decreased by 10% or more by making it technically possible and commercially beneficial to use the thinnest grades of soft magnetic materials, including amorphous materials, in a stacked core manufacturing.

The present invention is distinguished by the following features from prior laminated articles (such as stacked transformer cores) and methods for manufacturing the same: (a) a decrease in core loss destruction factor accomplished by applying an external compressive force of a predetermined magnitude to the joint-adjacent areas, which leads to (b) optimization of the flow of magnetic flux through the joint-adjacent cross-sections of the stacked core, which is achieved by concentrating the external compressive force in the form of a sharply localized and properly oriented compressive stress, which is achieved by (c) using the adhesive beads to perform simultaneously two completely different functions: (1) to bond two or more thin gauge strips into one thicker article and (2) to concentrate and to transfer along the stacked core height the compressive stress. In addition, the preferred method of adhesive application (disclosed below) can be incorporated easily as an additional procedure into existing core manufacturing technologies, so no major change in technology is required.

This invention also can be employed to decrease the acoustic noise of a three phase transformer with a stacked core, to facilitate the manufacture of a stacked core with a step-lap joint, and to increase core stacking productivity. Core stacking productivity is increased by ensuring the stability and repeatability of the geometry of all step-lap joints. The decrease of acoustic noise is achieved by changing the mechanism of core vibration caused by magnetostriction, which is an intrinsic property of any commercial soft magnetic material. This change is effected by forcing the stacked core to vibrate as a whole or at least as an assembly of groups of stacked magnetic articles. (In a conventional stacked core, each individual component vibrates independently.) According to this aspect of the present invention, acoustic noise is suppressed, to a certain degree, by bonding all magnetic articles forming one group in a step-lap joint design of a stacked transformer into one laminated item that reacts uniformly to the mechanical force produced by the magnetostrictive effect. As an additional step in the same direction, the whole core can be completely bonded to form one rigid unit. The bonding is preferably performed with a hot melt pressure sensitive adhesive (preferably one based on a mixture of stearine-isoprene-stearine rubbers and high hydrocarbon tackifying resins with added plastifiers and antioxidants, an example of which is commercially available as HB Fuller HM-1964) onto one surface of each pair of facing surfaces. The adhesive is applied in a pattern of thin and narrow beads parallel to each other but perpendicular to the rolling direction or, in case of an amorphous magnetic material, spinning direction (i.e., easiest axis of magnetization). To bond the magnetic articles inside the group, a roll-printing adhesive applicator is suggested, whereas, to bond the groups to form a core, a release paper with a pre-printed adhesive pattern is suggested.

Features distinguishing this aspect of the present invention from prior methods for making a stacked transformer core include: (a) application of a specifically chosen adhesive in a pattern of thin and narrow beads onto one of every two facing surfaces of the magnetic articles in a stacked core, which produces (b) a decrease in the level of acoustic noise generated by the stacked transformer core, due to a change in the mode of core vibration, namely (c) each group made of several (usually, six or seven) magnetic articles vibrates as a single unit or, in an advanced embodiment of this invention, the whole stacked core is forced to vibrate as one unit made of the magnetic material-adhesive pattern composite; and (d) an increase in productivity of the process of stacking the core results from the fact that the full group of six to seven strips can be handled as a single piece.

FIG. 3 schematically depicts a mobile adhesive bonding system in accordance with the present invention. This system uses a release paper to transfer the adhesive pattern onto the steel surface. In addition, by providing mobile machinery capable of handling the additional coil of steel, of applying the adhesive pattern onto the steel surface, and of delivering the adhesive-coated steel ribbon to the existing steel-cutting machine, this aspect of the invention provides an efficient means for experimenting with new silicon steel grades and conducting development work on new methods of bonding and new adhesive patterns and materials. The mobile adhesive bonding system is preferably compatible with existing transformer manufacturing facilities' steel-cutting equipment.

As shown, the system includes a first steel coil 20, which provides a ribbon or lamina 22 of steel; a roll of adhesive paper 24 pre-printed with an adhesive pattern as shown in FIG. 1; a roll 26 for receiving the used paper 28; a steel-cutting and stacking machine 30; and a decoiler for decoiling a second steel coil 40 to provide a second ribbon 42. The two steel coils 20 and 40 are essentially identical to each other. The release paper with the pre-printed adhesive pattern is brought into direct contact with the bottom surface of steel ribbon 22, and the adhesive pattern is transferred onto the bottom surface of ribbon 22. The used paper (without adhesive) is guided back and accumulated on the roll 26. The strip with adhesive pattern is brought into direct contact with the ribbon 42 from the standard coil 40, and is pressurized by the guiding rolls 44. After that point, the two strips are treated as one strip of double thickness. Preferably, the loop of the mobile adhesive bonding system is synchronized with the standard loop via the use of a common photodetecting system (not shown). In preferred embodiments of this system, the width of the steel may vary between 5 and 20 inches. The paper is preferably ¼-inch wider on each side. The steel thickness may vary from 7–11 mils.

As mentioned above, the solid adhesive film employed in the process disclosed by U.S. Pat. No. 4,277,530, when pressed between two sheets of steel, becomes thicker near the center and thinner at the edges of the laminate. When compression is applied to the stacked laminate, the difference in thickness creates compressive stresses and adversely affects the laminate's mechanical stability and shape. The present invention solves these problems by employing a thin bead adhesive pattern that results in an order of magnitude decrease in the adhesive pattern thickness, which decreases the space factor by less than 0.5%.

Another disadvantage with U.S. Pat. No. 4,277,530 is that it suggests a bond strength of at least 1,000 psi as measured in uniaxial tension at a temperature of less than 750° F. With the present invention, there is no requirement for longitudinal strength of bonding, nor is there is a requirement that the laminate be heated. Furthermore, the patent results in a 5–10% increases in power loss after bonding, due to a deterioration in steel performance. In contrast, the present invention improves the steel performance due to application of the adhesive pattern with dotted lines oriented perpendicularly to the rolling direction, as disclosed above.

Regarding U.S. Pat. No. 4,413,406, discussed above, the present invention is believed to be superior to the method disclosed in this patent because the present invention does not require that the sheets be heated and then allowed to cool to solidify the bond. On the contrary, the present invention employs a self-cured hot melt adhesive, and the sheets need not be heated or treated in any other way. Moreover, unlike the patent, the present invention specifically addresses ways to limit the decrease in space factor caused by the bonding process.

The present invention is by no means limited to the details specified above. For example, it is possible to combine the benefits of single-strip steps in the joints (which results in a decrease of the core destruction factor 2–3%) with the benefits of cutting and stacking the laminated article. This can be achieved by pulling the bonded laminate immediately after bonding (within about 60 seconds) through a pair of rolls having slightly ($\leq 1\%$) different diameters. This results in shifting one strip against the other in the rolling direction so that the step lap joint is made.

I claim:

1. A method for manufacturing a laminate for electrical applications comprising the steps of:

(a) applying hot melt adhesive in a pattern of thin beads onto one side of a first lamina or sheet of magnetic material, said pattern comprising a plurality of lines, said lines being substantially parallel to each other and substantially perpendicular to a direction of grain orientation or rolling direction of said lamina, wherein the spacing between the respective lines of adhesive is 1–20 millimeters and, for an approximate diameter (D) of each bead, the spacing (S) between the beads of each line is between D and 2D; and (b) stacking and bonding a second lamina or sheet onto said one side of said first lamina to form the laminate.

2. A method as recited in claim 1, wherein the spacing between the respective lines of adhesive is 5–10 millimeters.

3. A method as recited in claim 2, further comprising the step of joining at least two laminates to form an article having one or more joint-adjacent regions and wherein a hot melt adhesive is applied in said joint-adjacent regions.

4. A method as recited in claim 3, further comprising the step of applying a compressive force to specified areas of said laminate, wherein said compressive force is applied in said joint-adjacent regions, whereby the flow of magnetic flux is optimized.

5. A method as recited in claim 3, wherein said adhesive is applied throughout said laminate.

6. A method as recited in claim 5, wherein said compressive force is applied to said joint-adjacent regions.

7. A method as recited in claim 3, wherein said laminated article is a stacked transformer core.

8. A method as recited in claim 1, wherein said lamina comprise soft magnetic material.

9. A method as recited in claim 8, wherein said soft magnetic material comprises a textured silicon steel.

10. A method as recited in claim 8, wherein said soft magnetic material comprises an amorphous alloy.

11. A method as recited in claim 1, further comprising the step of cutting or shearing said laminate immediately after the step of applying adhesive.

12. A method as recited in claim 1, wherein said adhesive is applied by direct application of said beads onto said first lamina.

13. A method as recited in claim 1, wherein said adhesive is applied by a transfer technique.

14. A method as recited in claim 1, further comprising the steps of stacking at least six laminae to form a group that, in use, vibrates as a unit.

15. A method as recited in claim 14, further comprising the steps of adhesively bonding plural groups to form a transformer core that, in use, vibrates as a unit.

* * * * *